US012610371B2

(12) United States Patent
Venkob et al.

(10) Patent No.: US 12,610,371 B2
(45) Date of Patent: *Apr. 21, 2026

(54) SOUNDING REFERENCE SIGNAL TRANSMISSION OPTIMIZATION

(71) Applicant: Dell Products L.P., Round Rock, TX (US)

(72) Inventors: Satish Venkob, Mississauga (CA); Sunil Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 237 days.

This patent is subject to a terminal disclaimer.

(21) Appl. No.: 18/331,763

(22) Filed: Jun. 8, 2023

(65) Prior Publication Data
US 2024/0406966 A1　Dec. 5, 2024

(30) Foreign Application Priority Data
Jun. 1, 2023　(IN) ............................. 202311037849

(51) Int. Cl.
*H04W 72/231* (2023.01)
*H04B 17/309* (2015.01)
*H04W 72/232* (2023.01)

(52) U.S. Cl.
CPC ........ *H04W 72/231* (2023.01); *H04B 17/309* (2015.01)

(58) Field of Classification Search
None
See application file for complete search history.

(56) References Cited

U.S. PATENT DOCUMENTS 12,335,190 B2 *　6/2025　Go ........................ H04L 5/0051
2017/0302419 A1　10/2017　Liu et al.
(Continued)

FOREIGN PATENT DOCUMENTS

WO　　2022/197416　　9/2022

OTHER PUBLICATIONS

"5G; NR; Multiplexing and channel coding" 3GPP TS 38.212 version 16.2.0 Release 16, Jul. 2020, 154 pages.
(Continued)

*Primary Examiner* — Duc T Duong
(74) *Attorney, Agent, or Firm* — Amin, Turocy & Watson, LLP

(57) ABSTRACT

A system can communicate broadband cellular communications with a user equipment. The system can send a radio resource control message to the user equipment to establish a sounding reference signal mode for the broadband cellular communications, wherein the sounding reference signal mode is a periodic mode. The system can send a second message in a second format to the user equipment, wherein the second format differs from a radio resource control format, and wherein the second message indicates changing a number of sounding reference signal positions. The system can receive, from the user equipment, a third message that utilizes the number of sounding reference signal positions to convey sounding reference signal information. The system can save an indication of a channel quality that corresponds to the broadband cellular communications based on the sounding reference signal information in the third message.

20 Claims, 18 Drawing Sheets

(56) References Cited

U.S. PATENT DOCUMENTS

| | | | |
|---|---|---|---|
| 2019/0215110 A1 | 7/2019 | Yang et al. | |
| 2021/0099960 A1 | 4/2021 | Haim et al. | |
| 2021/0242991 A1* | 8/2021 | Manolakos | H04L 5/0094 |
| 2023/0042286 A1 | 2/2023 | Mondet et al. | |
| 2023/0048881 A1* | 2/2023 | Zhu | H04L 5/0094 |
| 2023/0261830 A1* | 8/2023 | Iwai | H04W 72/04 |
| | | | 370/330 |
| 2023/0269725 A1* | 8/2023 | Chen | H04W 72/0446 |
| | | | 370/329 |
| 2023/0291520 A1* | 9/2023 | Iwai | H04L 5/0048 |
| 2023/0353307 A1* | 11/2023 | Tian | H04W 72/0453 |
| 2023/0354310 A1* | 11/2023 | Huang | H04L 5/0053 |
| 2023/0421320 A1* | 12/2023 | Levitsky | H04L 5/0048 |
| 2024/0329229 A1* | 10/2024 | Manolakos | G01S 5/0236 |
| 2024/0405826 A1 | 12/2024 | Ly et al. | |
| 2025/0219786 A1* | 7/2025 | Gao | H04W 72/1268 |
| 2025/0350518 A1* | 11/2025 | Levitsky | H04L 5/0051 |

OTHER PUBLICATIONS

International Search Report and Written Opinion for PCT Application No. PCT/US2023/036192 mailed Mar. 13, 2024, 16 pages.
Intel Corporation: "On Beam Management Enhancement", 3GPP Draft; RI-1900503, vol. RAN WGI, No. Taipei; Jan. 20, 2019 [http://www.3gpp.org/ftp/Meetings%5F3GP P%5FSYNC/RAN1/Docs/RI%2DI900503%2Ezip] 13 pages.
Intel Corporation: "On Beam Management Overhead and Latency Reduction", 3GPP Draft; RI-1808719, vol. RAN WGI, No. Gothenburg, Sweden; Aug. 11, 2018 [http://www.3gpp.org/ftp/tsg%5Fran/WG1% 5FRL1/TSGR1%5F94/Docs/RI%2D1808719%2Ezip] 5 pages.
OPPO : "Discussion on UL Reference Signals for NR Positioning", 3GPP Draft; RI-1908357, vol. RAN WGI, No. Prague, CZ; Aug. 17, 2019, [http://www.3gpp.org/ftp/tsg_ran/WG1_RL 1/TSGR1_98/Docs/RI-1908357.zip] 6 pages.

International Search Report and Written Opinion for PCT Application No. PCT/US2023/036184 mailed Feb. 23, 2024, 16 pages.
Lenovo et al: "Enhancements on Multi-beam Operation", 3GPP Draft; RI-2100273, vol. RAN WGI, No. e-Meeting; Jan. 18, 2021, [https://ftp.3gpp.org/tsg_ran/WG1· RL1/T SGR1_104-e/Docs/RI-2100273.zipRI-2100273Multi-beam operation.docx] 11 pages.
International Search Report and Written Opinion for PCT Application No. PCT/US2023/036185 mailed Feb. 15, 2024, 13 pages.
Venkob, et al. "Sounding Reference Signal Transmission Optimization" U.S. Appl. No. 18/327,661, filed Jun. 1, 2023, 61 pages.
Venkob, et al. "Sounding Reference Signal Transmission Optimization with Carrier Aggregation" U.S. Appl. No. 18/327,683, filed Jun. 1, 2023, 66 pages.
"5G; NR; Radio Resource Control (RRC); Protocol specification (3GPP TS 38.331 version 17.0.0 Release 17)" ETSI TS 138 331, V17.0.0, May 2022, 1197 pages.
Notification Concerning Transmittal of Copy of International Preliminary Report on Patentability for PCT/US2023/036192 mailed Dec. 11, 2025, 10 pages.
Office Action mailed Oct. 1, 2025 for U.S. Appl. No. 18/327,661, 33 pages.
Office Action mailed Oct. 1, 2025 for U.S. Appl. No. 18/327,683, 51 pages.
Notification Concerning Transmittal of Copy of International Preliminary Report on Patentability for PCT Application No. PCT/US2023/036184 mailed Dec. 11, 2025, 9 pages.
Notification Concerning Transmittal of Copy of International Preliminary Report on Patentability for PCT Application No. PCT/US2023/036185 mailed Dec. 11, 2025, 8 pages.
European Office Action mailed Jan. 12, 2026 for European Patent Application No. 23813156.9, 3 pages.
European Office Action mailed Jan. 12, 2026 for European Patent Application No. 23813505.7, 3 pages.
European Office Action mailed Jan. 12, 2026 for European Patent Application No. 23813920.8, 3 pages.

* cited by examiner

100

200
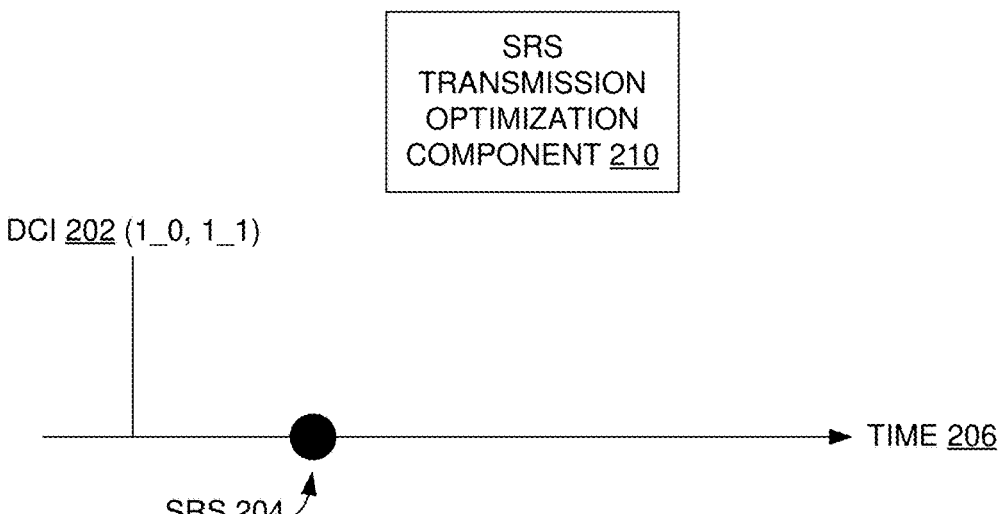
SRS
TRANSMISSION
OPTIMIZATION
COMPONENT 210
DCI 202 (1_0, 1_1)
TIME 206
SRS 204
FIG. 2

300
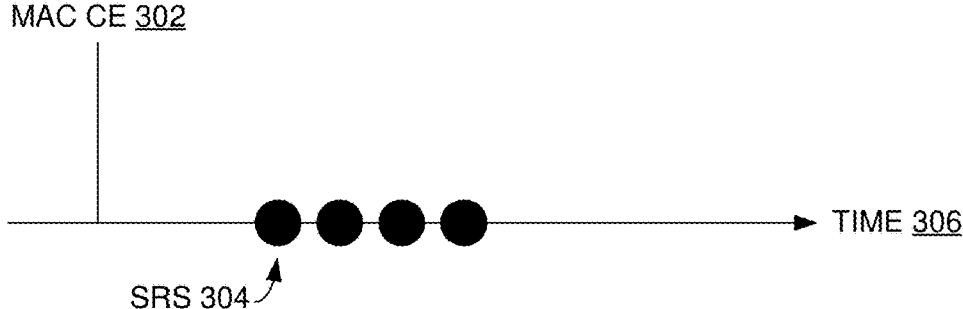
SRS
TRANSMISSION
OPTIMIZATION
COMPONENT 310
MAC CE 302
TIME 306
SRS 304
FIG. 3

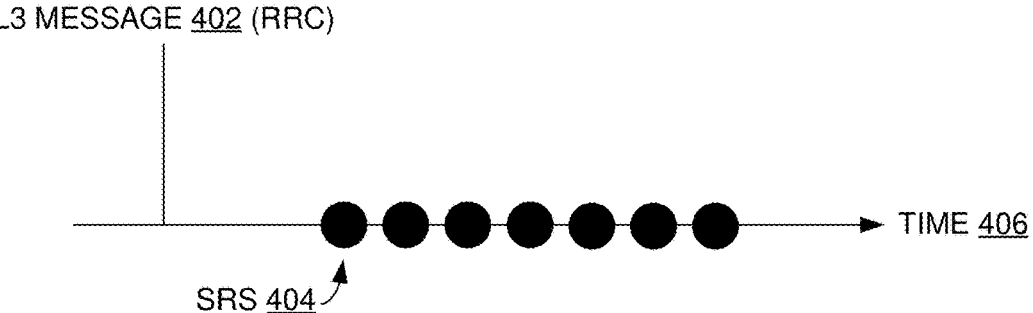
FIG. 4

500

SUBCARRIERS
504

OFDM SYMBOLS
506

SRS
TRANSMISSION
OPTIMIZATION
COMPONENT 510

KEY 508

■ SRS SYMBOL 1

▦ SRS SYMBOL 2

SUBCARRIERS
604

SRS
TRANSMISSION
OPTIMIZATION
COMPONENT 610

KEY 608

■ SRS SYMBOL 1

▨ SRS SYMBOL 2

OFDM SYMBOLS
606

700

SUBCARRIERS
704

SRS
TRANSMISSION
OPTIMIZATION
COMPONENT 710

KEY 708

■ SRS SYMBOL 1

▨ SRS SYMBOL 2

OFDM SYMBOLS
706

900

SUBCARRIERS
904

SRS
TRANSMISSION
OPTIMIZATION
COMPONENT 910

KEY 908

■ SRS SYMBOL 1

▨ SRS SYMBOL 2

▧ SRS SYMBOL 3

▨ SRS SYMBOL 4

OFDM SYMBOLS
906

1000

SUBCARRIERS
1004

SRS
TRANSMISSION
OPTIMIZATION
COMPONENT 1010

KEY 1008

■ SRS SYMBOL 1

▦ SRS SYMBOL 2

▨ SRS SYMBOL 3

▧ SRS SYMBOL 4

OFDM SYMBOLS
1006

1500

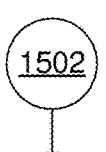

1502

COMMUNICATING BROADBAND CELLULAR COMMUNICATIONS WITH A USER EQUIPMENT 1504

SENDING A RADIO RESOURCE CONTROL MESSAGE TO THE USER EQUIPMENT TO ESTABLISH A SOUNDING REFERENCE SIGNAL MODE FOR THE BROADBAND CELLULAR COMMUNICATIONS, WHEREIN THE SOUNDING REFERENCE SIGNAL MODE IS A PERIODIC MODE 1506

SENDING A SECOND MESSAGE IN A SECOND FORMAT TO THE USER EQUIPMENT, WHEREIN THE SECOND FORMAT DIFFERS FROM A RADIO RESOURCE CONTROL FORMAT, AND WHEREIN THE SECOND MESSAGE INDICATES CHANGING A NUMBER OF SOUNDING REFERENCE SIGNAL POSITIONS 1508

RECEIVING, FROM THE USER EQUIPMENT, A THIRD MESSAGE THAT UTILIZES THE NUMBER OF SOUNDING REFERENCE SIGNAL POSITIONS TO CONVEY SOUNDING REFERENCE SIGNAL INFORMATION 1510

SAVING AN INDICATION OF A CHANNEL QUALITY THAT CORRESPONDS TO THE BROADBAND CELLULAR COMMUNICATIONS BASED ON THE SOUNDING REFERENCE SIGNAL INFORMATION IN THE THIRD MESSAGE 1512

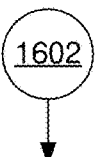

( 1602 )

AS PART OF BROADBAND CELLULAR COMMUNICATIONS WITH USER EQUIPMENT, SENDING A RADIO RESOURCE CONTROL MESSAGE TO THE USER EQUIPMENT TO ESTABLISH A PERIODIC SOUNDING REFERENCE SIGNAL MODE FOR THE BROADBAND CELLULAR COMMUNICATIONS 1604

SENDING A SECOND MESSAGE IN A SECOND FORMAT TO THE USER EQUIPMENT, WHEREIN THE SECOND FORMAT DIFFERS FROM A RADIO RESOURCE CONTROL FORMAT, AND WHEREIN THE SECOND MESSAGE INDICATES MODIFYING A NUMBER OF SOUNDING REFERENCE SIGNAL POSITIONS 1606

RECEIVING, FROM THE USER EQUIPMENT, A THIRD MESSAGE THAT UTILIZES THE NUMBER OF SOUNDING REFERENCE SIGNAL POSITIONS TO CONVEY SOUNDING REFERENCE SIGNAL INFORMATION 1608

SAVING AN INDICATION OF A CHANNEL QUALITY THAT CORRESPONDS TO THE BROADBAND CELLULAR COMMUNICATIONS BASED ON THE SOUNDING REFERENCE SIGNAL INFORMATION IN THE THIRD MESSAGE 1610

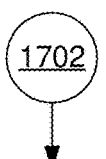

1702

SENDING, TO A USER EQUIPMENT, A FIRST MESSAGE IN A FIRST FORMAT TO ESTABLISH A SOUNDING REFERENCE SIGNAL MODE FOR BROADBAND CELLULAR COMMUNICATIONS WITH THE USER EQUIPMENT 1704

SENDING, TO THE USER EQUIPMENT, A SECOND MESSAGE IN A SECOND FORMAT, WHEREIN THE FIRST FORMAT DIFFERS FROM THE SECOND FORMAT, AND WHEREIN THE SECOND MESSAGE INDICATES MODIFYING A NUMBER OF SOUNDING REFERENCE SIGNAL POSITIONS 1706

RECEIVING, FROM THE USER EQUIPMENT, A THIRD MESSAGE THAT UTILIZES THE NUMBER OF SOUNDING REFERENCE SIGNAL POSITIONS TO CONVEY SOUNDING REFERENCE SIGNAL INFORMATION 1708

SAVING AN INDICATION OF A CHANNEL QUALITY THAT CORRESPONDS TO THE BROADBAND CELLULAR COMMUNICATIONS BASED ON THE SOUNDING REFERENCE SIGNAL INFORMATION IN THE THIRD MESSAGE 1710

SOUNDING REFERENCE SIGNAL TRANSMISSION OPTIMIZATION

RELATED APPLICATIONS

The subject patent application claims priority to Indian Provisional Patent Application No. 202311037849, filed Jun. 1, 2023, and entitled "SOUNDING REFERENCE SIGNAL TRANSMISSION OPTIMIZATION," the entirety of which application is hereby incorporated by reference herein.

The subject patent application is related by subject matter to, U.S. patent application Ser. No. 18/327,661, filed Jun. 1, 2023, and entitled "SOUNDING REFERENCE SIGNAL TRANSMISSION OPTIMIZATION," the entirety of which application is hereby incorporated by reference herein.

The subject patent application is related by subject matter to, U.S. patent application Ser. No. 18/327,683, filed Jun. 1, 2023, and entitled "SOUNDING REFERENCE SIGNAL TRANSMISSION OPTIMIZATION WITH CARRIER AGGREGATION," the entirety of which application is hereby incorporated by reference herein.

BACKGROUND

In cellular broadband communications, a user equipment and a core network can communicate about the status of a communication channel used for data transmission.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can communicate broadband cellular communications with a user equipment (UE). The system can send a radio resource control message (RRC) to the UE to establish a sounding reference signal (SRS) mode for the broadband cellular communications, wherein the SRS is a periodic mode. The system can send a second message in a second format to the UE, wherein the second format differs from a RRC format, and wherein the second message indicates changing a number of SRS positions. The system can receive, from the UE, a third message that utilizes the number of SRS positions to convey SRS information. The system can save an indication of a channel quality that corresponds to the broadband cellular communications based on the SRS information in the third message.

An example method can comprise, as part of broadband cellular communications with a UE, sending, by a system comprising a processor, a RRC message to the UE to establish a periodic SRS mode for the broadband cellular communications. The method can further comprise sending, by the system, a second message in a second format to the UE, wherein the second format differs from a RRC format, and wherein the second message indicates modifying a number of SRS positions. The method can further comprise receiving, by the system and from the UE, a third message that utilizes the number of SRS positions to convey SRS information. The method can further comprise saving, by the system, an indication of a channel quality that corresponds to the broadband cellular communications based on the SRS information in the third message.

An example non-transitory computer-readable medium can comprise instructions that, in response to execution, cause a system comprising a processor to perform operations. These operations can comprise sending, to a UE, a first message in a first format to establish a SRS mode for broadband cellular communications with the UE. These operations can further comprise sending, to the UE, a second message in a second format, wherein the first format differs from the second format, and wherein the second message indicates modifying a number of SRS positions. These operations can further comprise receiving, from the UE, a third message that utilizes the number of SRS positions to convey SRS information. These operations can further comprise saving an indication of a channel quality that corresponds to the broadband cellular communications based on the SRS information in the third message.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates an example aperiodic SRS transmission triggered by a gNodeB (gNB) that can facilitate SRS transmission optimization, in accordance with an embodiment of this disclosure;

FIG. 3 illustrates example semi-persistent SRS transmissions triggered by a gNB that can facilitate SRS transmission optimization, in accordance with an embodiment of this disclosure;

FIG. 4 illustrates example periodic SRS transmissions triggered by a Level 3 (L3)/RRC message that can facilitate SRS transmission optimization, in accordance with an embodiment of this disclosure;

FIG. 15 illustrates an example process flow that can facilitate SRS transmission optimization, in accordance with an embodiment of this disclosure;

FIG. 16 illustrates another example process flow that can facilitate SRS transmission optimization, in accordance with an embodiment of this disclosure;

FIG. 17 illustrates another example process flow that can facilitate SRS transmission optimization, in accordance with an embodiment of this disclosure;

DETAILED DESCRIPTION

Overview

Figure 1:
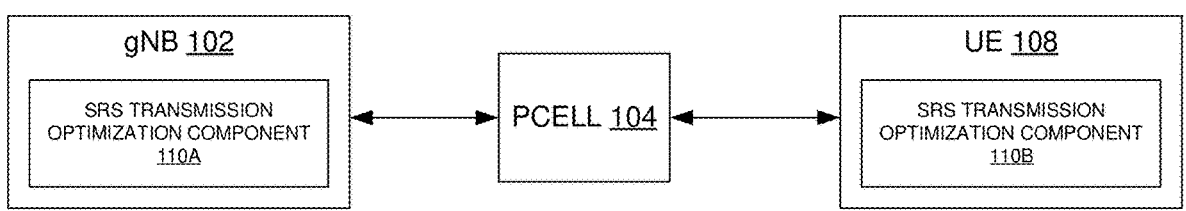
FIG. 1 illustrates an example system architecture that can facilitate SRS transmission optimization, in accordance with an embodiment of this disclosure.

A SRS can be sent by UE according to instructions provided by a gNB. The SRS can be used by the gNB to measure an uplink (UL) channel propagation, and can be used by the gNB for channel aware scheduling, link adaptation (LA), and downlink channel estimation when channel reciprocity exists, such as in time-division duplexing (TDD) deployments.

In some implementations of a 3rd Generation Partnership Project (3GPP) protocol, a SRS can occupy 1, 2, or 4 symbols in a time domain, and all resource blocks (RBs) in a frequency domain. A SRS can be transmitted independently of physical uplink shared channel (PUSCH) scheduling and PUSCH bandwidth.

A SRS can be triggered non-periodically using DCI messages, such as DCI_0_1 and/or DCI_1_1; in a semi-persistent manner using a MAC CE message; and/or periodically as soon as it is configured using a Layer 3 (L3) signaling (e.g., RRC signaling, and/or SRS resource set configuration).

In some examples, when a SRS is periodically triggered (which can be highly likely in some deployments), if channel conditions improve at the UE and there is a desire to reduce a number of symbols used for SRS transmissions, an approach to reducing the number of symbols can be to use RRC signaling. A problem with using RRC signaling for this purpose can be that it can be slow (being sent from a centralized unit (CU) of a radio rather than from a distributed unit (DU)), and result in more radio resource usage (both for the SRS symbols until reconfiguration, as well as for the signaling messages). Also, with this approach, to reduce or increase the symbols used for SRS, which can be indicated with 2 bits, the gNB can need to transmit a whole RRC signaling message as currently defined by 3GPP specifications. The present techniques can be implemented to facilitate a more efficient and faster approach to increasing or decreasing symbols used for SRS (as per UE conditions and other criteria) during periodic and semipersistent SRS transmission.

In a periodic trigger case (e.g., FIG. 4), once a SRS-Resource set configuration is received in a RRC message, it can be that there is no efficient dynamic mechanism using Layer 1 (DCI) or Layer 2 (MAC CE) signaling to reduce or increase a number of symbols used for SRS, according to prior techniques that use 3GPP specifications. Rather, an approach used is for a gNB to trigger RRC signaling, which can be slower and consume radio resources, in addition to wasting radio resources relative to an amount data being conveyed about increasing or reducing a number of symbols used for SRS transmissions.

For example, if a UE radio frequency (RF) condition changes from good to bad (or vice versa), and if a gNB attempts to adapt SRS transmission accordingly to conserve valuable radio symbols for data transmission (e.g., switching from using four symbols to using one symbol in good UE conditions, or switching from using one symbol to using four symbols in poor conditions for better channel estimation), then the prior techniques can lack an efficient and/or fast mechanism to effectuate this, leading to wasting valuable radio resources (symbols).

The present techniques can be implemented to facilitate reusing a SRS request field with DCI, even for periodic transmission, to indicate a number of symbols to use for SRS. In some prior techniques, a SRS request field within a DCI is used only in an aperiodic case to specify a SRS resource set, as follows:

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 SRS resource set(s) configured by SRS-PosResourceSet with an entry in aperiodicSRS-ResourceTriggerList set to 1 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a 1st set of serving cells configured by higher layers |

5
-continued
6

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 10 | SRS resource set(s) configured by SRS-ResourceSet with higher layer parameter aperiodicSRS-ResourceTrigger set to 2 or an entry in aperiodicSRS-ResourceTriggerList set to 2 SRS resource set(s) configured by SRS-PosResourceSet with an entry in aperiodicSRS-ResourceTriggerList set to 2 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a $2^{nd}$ set of serving cells configured by higher layers |
| 11 | SRS resource set(s) configured by SRS-ResourceSet with higher layer parameter aperiodicSRS-ResourceTrigger set to 3 or an entry in aperiodicSRS-ResourceTriggerList set to 3 SRS resource set(s) configured by SRS-PosResourceSet with an entry in aperiodicSRS-ResourceTriggerList set to 3 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a $3^{rd}$ set of serving cells configured by higher layers |

The present techniques can be implemented to facilitate re-using a SRS request, even during periodic SRS transmission, as follows:

| Value of SRS Request field | Interpretation by UE (if in periodic SRS configuration mode) |
|---|---|
| 00 | No SRS (stop SRS transmission) |
| 01 | SRS transmission using 1 symbol |
| 10 | SRS transmission using 2 symbols |
| 11 | SRS transmission using 4 symbols |

In some examples, it can be that other SRS resource configurations remain the same, and only a number of symbols in the time domain changes, as per this field in a DCI signal.

In some examples, upon receiving this SRS request field in a periodic mode, a UE can transmit a number of symbols as specified by the SRS request field, while other SRS resource configurations specified by RRC (L3) signaling remain the same.

Figure 11:
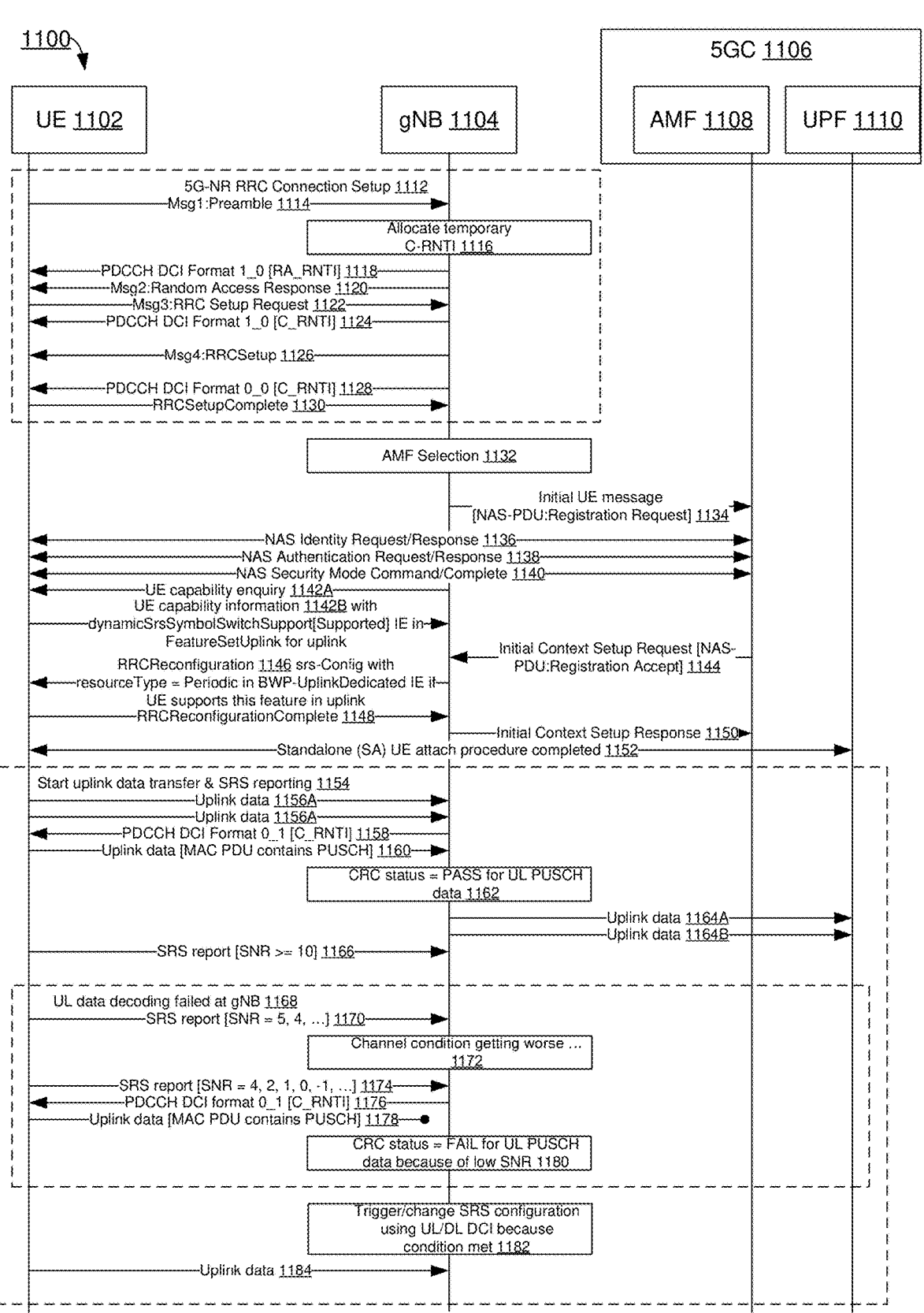
FIG. 11 and FIG. 12 illustrate an example signal flow for 5G standalone (SA) attach and UL Data Flow with trigger SRS Symbol modification using a downlink control information (DCI), and that can facilitate SRS transmission optimization in accordance with an embodiment of this disclosure.
Figure 12:
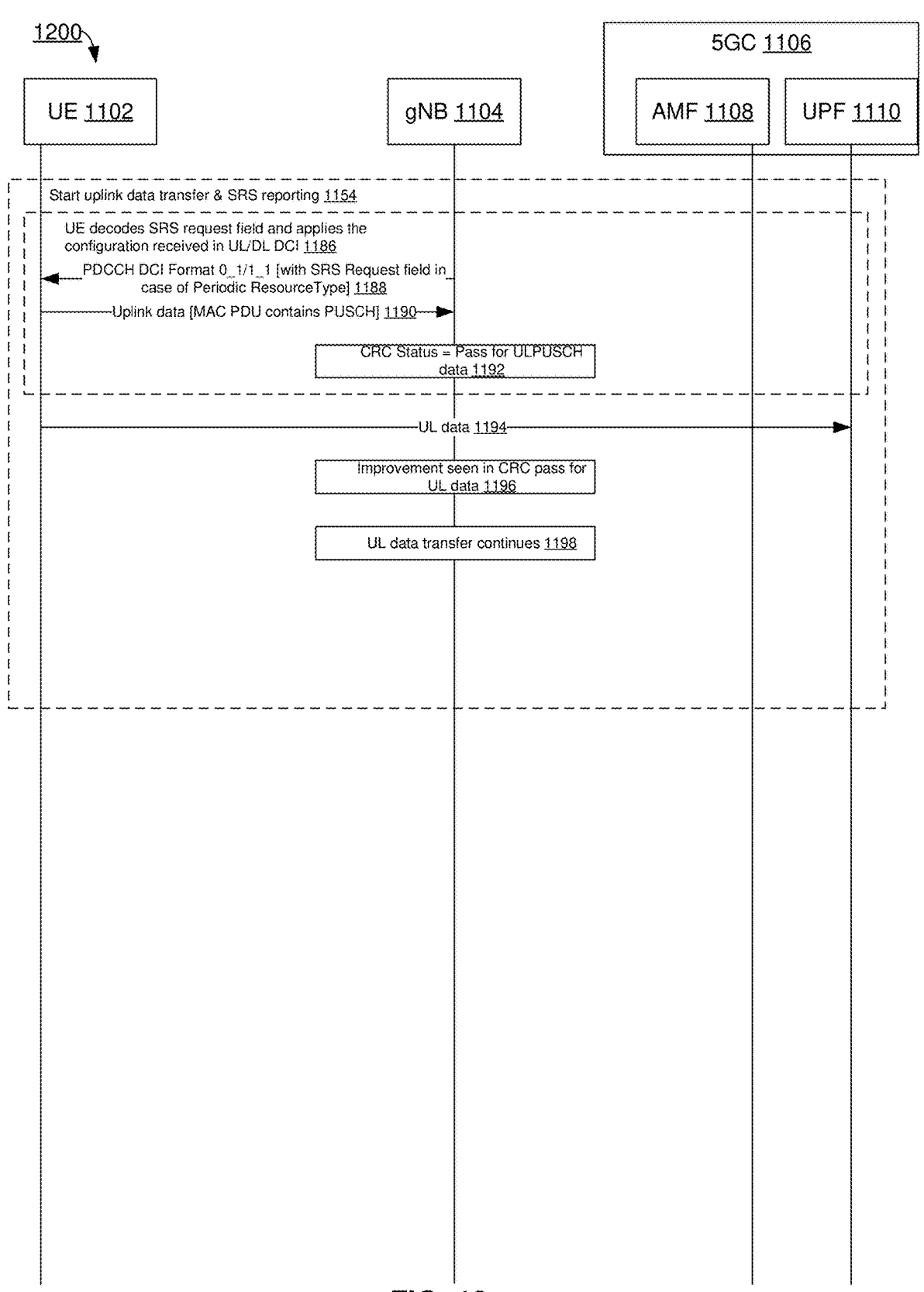

An associated example signal flow is illustrated in FIGS. 11 and 12.

The present techniques can be implemented to facilitate using a MAC CE (e.g., Activation/Deactivation of SRS symbol information), including for periodic transmission, to indicate a number of symbols to use for SRS. A MAC CE can be implemented in accordance with the table of values of a SRS request field, above, to indicate a number of SRS symbols to use during a periodic SRS mode. Upon receiving this MAC CE, a UE can transmit a number of symbols as specified by the CE, and other SRS resource configurations specified by RRC (L3) signaling can remain unchanged.

Figure 13:
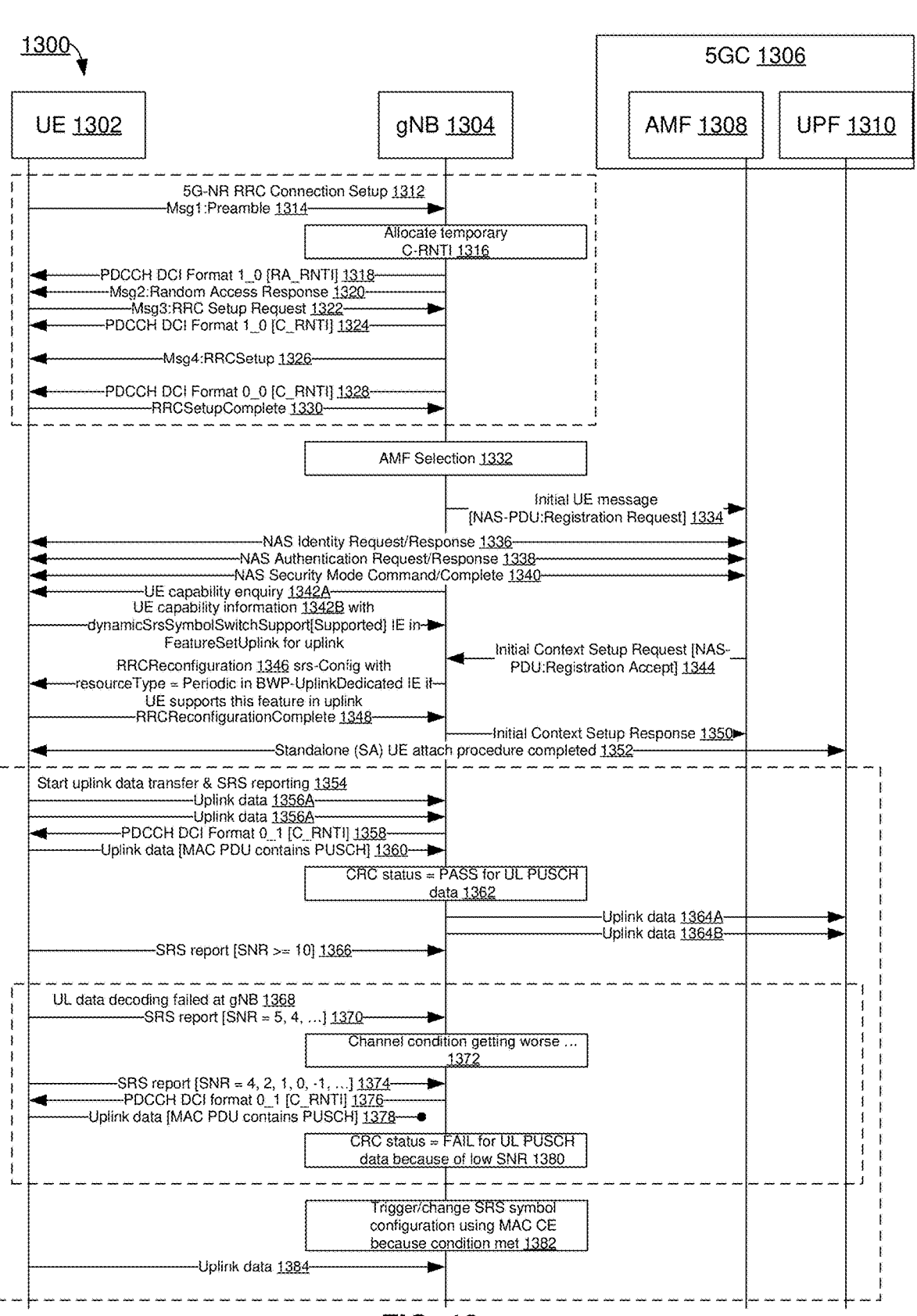
FIG. 13 and FIG. 14 illustrate an example signal flow for 5G SA attach and UL Data Flow with trigger SRS symbol modification using a medium access control control element (MAC CE or MAC-CE), and that can facilitate SRS transmission optimization in accordance with an embodiment of this disclosure.
Figure 14:
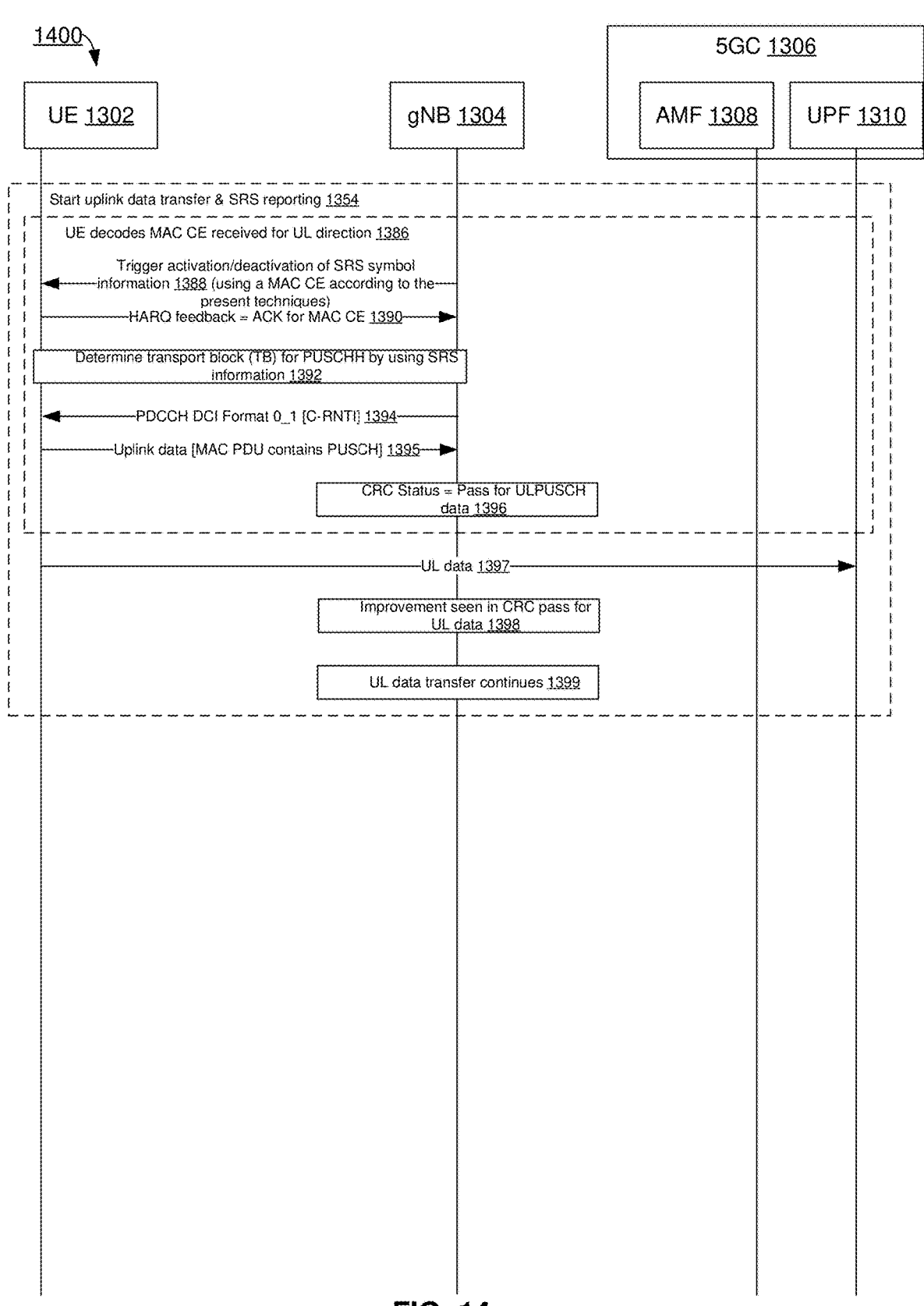

An associated example signal flow is illustrated in FIGS. 13 and 14.

| 7 | 6 | 5 | 4 | 3 | 2 | 1 | 0 | Bit |
|---|---|---|---|---|---|---|---|---|
| R | R | Logical channel identifier (LCID) | | | | | | Oct 1 |
| R | R | R | R | R | R | SRS Symbol Length | | Oct 2 |

| SRS Symbol Length | SRS Symbol Interpretation by UE |
|---|---|
| 0 | No SRS (stop SRS transmission) |
| 1 | SRS transmission using 1 symbol |
| 10 | SRS transmission using 2 symbols |
| 11 | SRS transmission using 4 symbols |

According to the present techniques, a IE can be used in UE capability to support dynamic switching of SRS symbols. An IE, dynamicSRSSymbolSwitchSupport, can be implemented for uplink in FeatureSetUplink. Where a UE supports this IE, it can indicate that the UE will support dynamic SRS symbol switch configuration changes in an uplink direction.

A FeatureSetUplinkIE can be used to indicate the features that the UE supports on carriers corresponding to one band entry in a band combination. An example FeatureSetUplinkIE is as follows:

-- ASN1START
-- TAG-FEATURESETUPLINK-START

FeatureSetUplink ::=                          SEQUENCE {

-continued

| | |
|---|---|
| featureSetListPerUplinkCC | SEQUENCE (SIZE (1..maxNrofServingCells)) |
| OF FeatureSetUplinkPerCC-Id, | |
| scalingFactor | ENUMERATED {f0p4, f0p75, f0p8} |
| OPTIONAL, | |
| crossCarrierScheduling-OtherSCS | ENUMERATED {supported} |
| OPTIONAL, | |
| intraBandFreqSeparationUL | FreqSeparationClass |
| OPTIONAL, | |
| searchSpaceSharingCA-UL | ENUMERATED {supported} |
| OPTIONAL, | |
| .................... | |
| dynamicSrsSymbolSwitchSupport | ENUMERATED {supported} |
| OPTIONAL, | |
| .................. | |
| dummy1 | DummyI |
| OPTIONAL, | |
| } | |

In some examples, a UE is capable of handling a DCI field "SRS request" for uplink DCI format 0_1/1_1, as described above.

In some examples a UE is capable of handling a MAC CE (e.g., "Activation/Deactivation of SRS symbol information," as described above.

In some examples, the present techniques can be implemented in a UE, as follows. A UE indicator can be implemented that implements the present techniques. That is, a UE can send a bit in a UE capability indicator to a centralized unit of a gNB to indicate that SRS transmission optimization is or is not supported.

Where the UE capability indicator indicates that SRS transmission optimization is supported, a UE can increase and/or decrease a number of SRS symbols transmitted (after SRS transmission has been activated by either a periodic or semi-persistent SRS mode) as instructed by a DCI message and/or a MAC CE message.

Where the UE capability indicator indicates that SRS transmission optimization is not supported, it can be that a gNB does not use DCI messages and/or MAC CE messages to increase and/or decrease a number of SRS symbols transmitted, and/or a UE ignores such DCI messages and/or MAC CE if the UE receives them.

The present techniques can be implemented to trigger an increase or decrease of SRS symbols via MAC CE and/or DCI based on changing conditions. A gNB can instruct a UE to increase or decrease a number of SRS symbols transmitted based on conditions such as what follows.

An example of changing conditions can occur where a UE is in good RF conditions, and measured signal to interference and noise ratio (SINR) is higher than a certain threshold (and other indicators reported, like channel quality indicator (CQI), and block error rate (BLER), can point to good radio conditions), then the gNB can instruct the UE (through DCI and/or MAC CE messaging) to decrease a number of SRS symbols. For example, the number of SRS symbols can be reduced from four to two, from four to one, or from two to one, depending on different SINR thresholds.

Another example of changing conditions can occur where a UE is in bad RF conditions, and measured SINR is lower than a certain threshold (and other indicators reported, like CQI and BLER, point to poor radio conditions), then the gNB can instruct the UE (through DCI and/or MAC CE messaging) to increase a number of SRS symbols. For example, the number of SRS symbols can be increased from one to two, from one to four, or from two to four, depending on different SINR thresholds.

Another example of changing conditions can occur where a UE is in fast changing radio conditions (e.g., example mobile scenarios), then the gNB can instruct the UE (through DCI and/or MAC CE messaging) to increase or decrease a number of SRS symbols, depending on measured SINR thresholds (and/or other indicators, like CQI and BLER).

Example Architecture

FIG. 1 illustrates an example system architecture 100 that can facilitate SRS transmission optimization in accordance with an embodiment of this disclosure. In some examples, part(s) of system architecture can be used to implement the example transitions of FIGS. 2-10, the example signal flows of FIGS. 11-14, and/or the example process flows of FIGS. 15-17.

In cellular communications, there can be a master cell group (MCG) to which a UE initially registers. A cell that is used to initiate initial access can be referred to as a primary cell (Pcell).

The examples herein generally relate to 5G cellular communications networks, where Pcells are used. It can be appreciated that the present techniques can be applied to other types of cellular communications networks for SRS transmission optimization.

As depicted, system architecture 100 comprises gNodeB (gNB) 102, Pcell 104, UE 108, SRS transmission optimization component 110A, and SRS transmission optimization component 110B.

gNB 102 can generally comprise a cellular fifth-generation (5G) base station, can comprise multiple antennas, and can concurrently communicate with multiple instances of UE 108. UE 108 can generally comprise a computing device that is configured to be used directly by an end-user to communicate with gNB 102. Pcell 104 can be a Pcell as described herein, and that is communicatively coupled to both gNB 102 and UE 108.

SRS transmission optimization component 110A can generally comprise a component of gNB 102 that facilitates SRS transmission optimization for gNB 102 as described herein. Similarly, SRS transmission optimization component 110B can generally comprise a component of UE 108 that facilitates SRS transmission optimization for UE 108 as described herein.

Example Transmissions

FIG. 2 illustrates an example aperiodic SRS transmission 200 triggered by a gNB that can facilitate SRS transmission optimization, in accordance with an embodiment of this disclosure. In some examples, part(s) of aperiodic SRS transmission 200 of FIG. 2 can be implemented by part(s) of system architecture 100 of FIG. 1 to facilitate SRS transmission optimization.

Aperiodic SRS transmission 200 comprises DCI 202, SRS 204, time 206, and SRS transmission optimization component 210 (which can be similar to SRS transmission optimization component 110A and/or SRS transmission optimization component 110B of FIG. 1).

DCI 202 can comprise a DCI message. Sending DCI 202 can trigger sending one aperiodic SRS at some point during time 206.

Per a 3GPP protocol, SRS triggering can be configured by a resource-Type information element (IE), a SRS-Resource IE within RRC signaling messages. A resource-Type IE can set an aperiodic (FIG. 2), semi-persistent (FIG. 3), or periodic (FIG. 4) SRS.

FIG. 3 illustrates example semi-persistent SRS transmissions 300 triggered by a gNB that can facilitate SRS transmission optimization, in accordance with an embodiment of this disclosure. In some examples, part(s) of semi-persistent SRS transmissions 300 of FIG. 3 can be implemented by part(s) of system architecture 100 of FIG. 1 to facilitate SRS transmission optimization.

Semi-persistent SRS transmissions 300 comprises MAC CE 302, SRS 304, time 306, and SRS transmission optimization component 310 (which can be similar to SRS transmission optimization component 110A and/or SRS transmission optimization component 110B of FIG. 1).

MAC CE 302 can comprise a MAC CE message. Sending MAC CE 302 can trigger sending multiple semi-persistent SRS messages in SRS 304 at points during time 306.

FIG. 4 illustrates example periodic SRS transmissions 400 triggered by a L3/RRC message that can facilitate SRS transmission optimization, in accordance with an embodiment of this disclosure. In some examples, part(s) of periodic SRS transmissions 400 of FIG. 4 can be implemented by part(s) of system architecture 100 of FIG. 1 to facilitate SRS transmission optimization.

Periodic SRS transmissions 400 comprises L3 message 402, SRS 404, time 406, and SRS transmission optimization component 410 (which can be similar to SRS transmission optimization component 110A and/or SRS transmission optimization component 110B of FIG. 1).

L3 message 402 can comprise a RRC message. Sending MAC CE 402 can trigger sending multiple periodic SRS messages in SRS 404 at points during time 406.

Figure 5:
FIG. 5 illustrates an example of multiplexing two SRS transmissions in a comb 2 case, with one SRS symbol, that can facilitate SRS transmission optimization, in accordance with an embodiment of this disclosure.

FIG. 5 illustrates an example 500 of multiplexing two SRS transmissions in a comb 2 case, with one SRS symbol, that can facilitate SRS transmission optimization, in accordance with an embodiment of this disclosure. In some examples, part(s) of example 500 of FIG. 5 can be implemented by part(s) of system architecture 100 of FIG. 1 to facilitate SRS transmission optimization.

In an aperiodic mode, DCI_0_1 and DCI_1_1 can be used to request a UE to transmit SRS. The SRS request filed within the DCI can be used specify the SRS resource set to use. The SRS resource set (which can range from 0 to 15, in some examples) can specify SRS resources the UE should transmit on. The SRS resources can specify the number of symbols (e.g., 1, 2, or 4) in a time domain, in addition to other parameters, like a transmission comb, a number of SRS ports, etc.

However, in a periodic trigger case (e.g., FIG. 4), once the SRS-Resource set configuration is received in a RRC message, it can be that there is no dynamic mechanism using Layer 1 (DCI) or layer signaling (MAC CE) to reduce or increase a number of symbols used for SRS, using prior techniques according to 3GPP specifications.

FIGS. 5-10 illustrate examples of how, according to the present techniques, SRS transmissions occur in when multiplexing 2 SRS and 4 SRS transmissions respectively, with 1, 2 and 4 symbols used for the SRS transmissions by the UE.

FIG. 5 comprises subcarriers 504 (which can comprise a sideband of a radio-frequency (RF) carrier wave that is modulated to transmit additional data), orthogonal frequency-division multiplexing (OFDM) symbols 506 (which can be used to encode data on multiple frequencies), key 508 (which indicates how SRS symbols are used in FIG. 5), and SRS transmission optimization component 510 (which can be similar to SRS transmission optimization component 110A and/or SRS transmission optimization component 110B of FIG. 1).

Figure 6:
FIG. 6 illustrates an example of multiplexing two SRS transmissions in a comb 2 case, with two SRS symbols, that can facilitate SRS transmission optimization, in accordance with an embodiment of this disclosure.

FIG. 6 illustrates an example 600 of multiplexing two SRS transmissions in a comb 2 case, with two SRS symbols, that can facilitate SRS transmission optimization, in accordance with an embodiment of this disclosure. In some examples, part(s) of example 600 of FIG. 6 can be implemented by part(s) of system architecture 100 of FIG. 1 to facilitate SRS transmission optimization.

FIG. 6 comprises subcarriers 604 (which can be similar to subcarriers 504 of FIG. 5), OFDM symbols 606 (which can be similar to OFDM symbols 506), key 608 (which can be similar to key 508), and SRS transmission optimization component 610 (which can be similar to SRS transmission optimization component 110A and/or SRS transmission optimization component 110B of FIG. 1).

Figure 7:
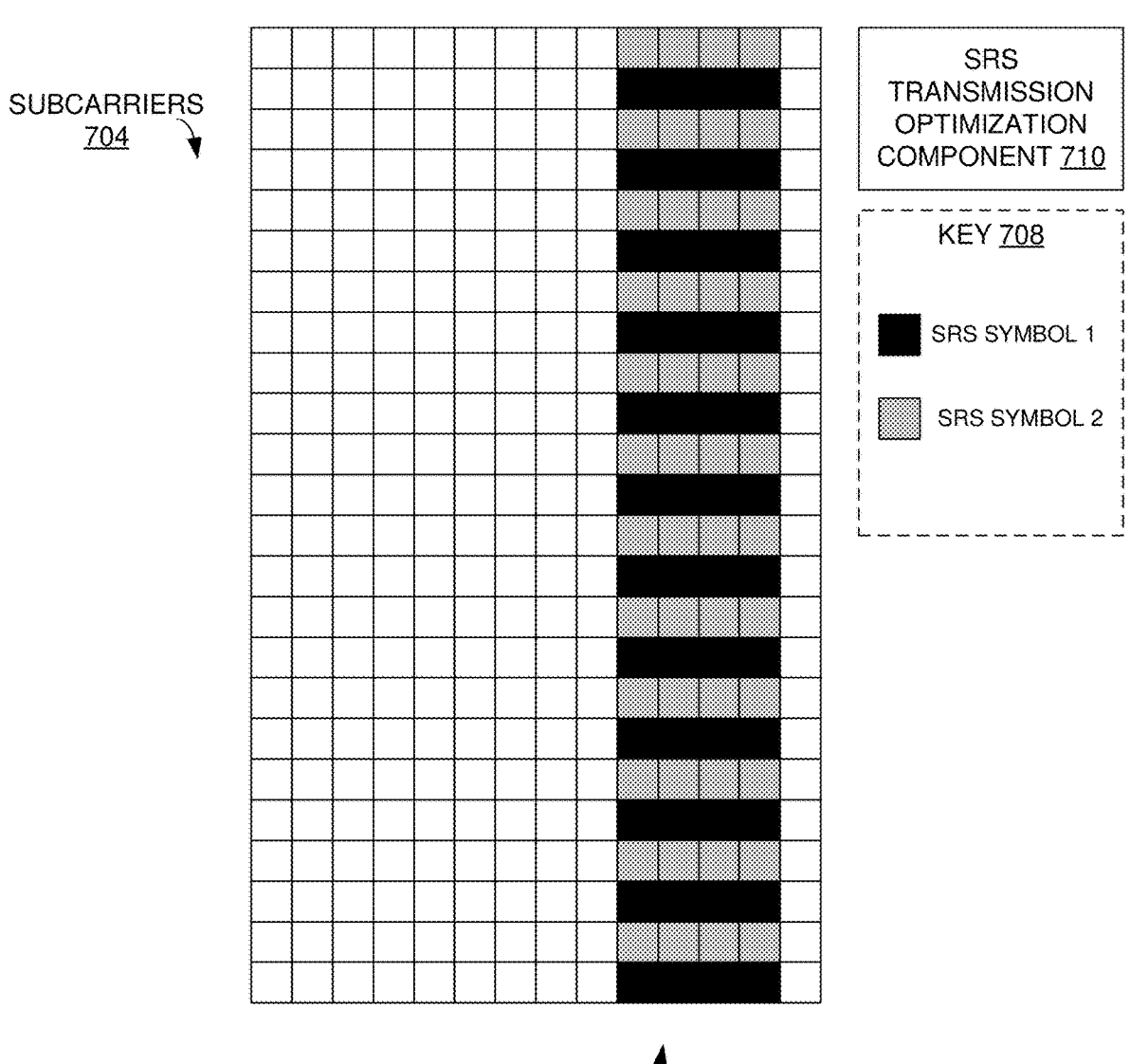
FIG. 7 illustrates an example of multiplexing two SRS transmissions in a comb 2 case, with four SRS symbols, that can facilitate SRS transmission optimization, in accordance with an embodiment of this disclosure.

FIG. 7 illustrates an example 700 of multiplexing two SRS transmissions in a comb 2 case, with four SRS symbols, that can facilitate SRS transmission optimization, in accordance with an embodiment of this disclosure. In some examples, part(s) of example 700 of FIG. 7 can be implemented by part(s) of system architecture 100 of FIG. 1 to facilitate SRS transmission optimization.

FIG. 7 comprises subcarriers 704 (which can be similar to subcarriers 504 of FIG. 5), OFDM symbols 706 (which can be similar to OFDM symbols 506), key 708 (which can be similar to key 508), and SRS transmission optimization component 710 (which can be similar to SRS transmission optimization component 110A and/or SRS transmission optimization component 110B of FIG. 1).

Figure 8:
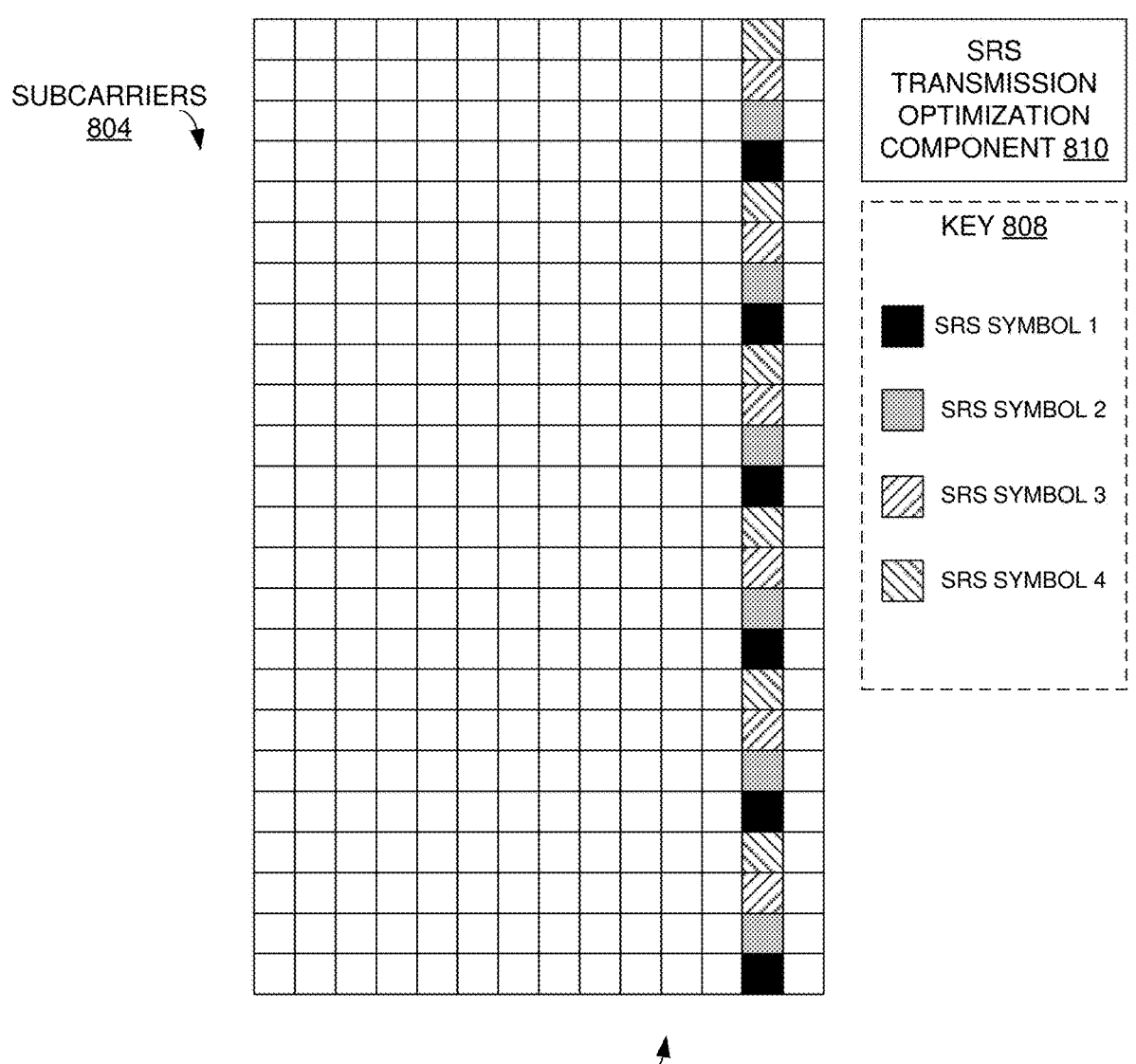
FIG. 8 illustrates an example of multiplexing two SRS transmissions in a comb 4 case, with one SRS symbol, that can facilitate SRS transmission optimization, in accordance with an embodiment of this disclosure.

FIG. 8 illustrates an example 800 of multiplexing two SRS transmissions in a comb 4 case, with one SRS symbol, that can facilitate SRS transmission optimization, in accordance with an embodiment of this disclosure. In some examples, part(s) of example 800 of FIG. 8 can be implemented by part(s) of system architecture 100 of FIG. 1 to facilitate SRS transmission optimization.

FIG. 8 comprises subcarriers 804 (which can be similar to subcarriers 504 of FIG. 5), OFDM symbols 806 (which can be similar to OFDM symbols 506), key 808 (which can be similar to key 508), and SRS transmission optimization component 810 (which can be similar to SRS transmission optimization component 110A and/or SRS transmission optimization component 110B of FIG. 1).

Figure 9:
FIG. 9 illustrates an example of multiplexing two SRS transmissions in a comb 4 case, with two SRS symbols, that can facilitate SRS transmission optimization, in accordance with an embodiment of this disclosure.

FIG. 9 illustrates an example 900 of multiplexing two SRS transmissions in a comb 4 case, with two SRS symbols, that can facilitate SRS transmission optimization, in accordance with an embodiment of this disclosure. In some examples, part(s) of example 900 of FIG. 9 can be implemented by part(s) of system architecture 100 of FIG. 1 to facilitate SRS transmission optimization.

FIG. 9 comprises subcarriers 904 (which can be similar to subcarriers 504 of FIG. 5), OFDM symbols 906 (which can be similar to OFDM symbols 506), key 908 (which can be similar to key 508), and SRS transmission optimization component 910 (which can be similar to SRS transmission optimization component 110A and/or SRS transmission optimization component 110B of FIG. 1).

Figure 10:
FIG. 10 illustrates an example of multiplexing two SRS transmissions in a comb 4 case, with four SRS symbols, that can facilitate SRS transmission optimization, in accordance with an embodiment of this disclosure.

FIG. 10 illustrates an example 1000 of multiplexing two SRS transmissions in a comb 4 case, with four SRS symbols, that can facilitate SRS transmission optimization, in accordance with an embodiment of this disclosure. In some examples, part(s) of example 1000 of FIG. 10 can be implemented by part(s) of system architecture 100 of FIG. 1 to facilitate SRS transmission optimization.

FIG. 10 comprises subcarriers 1004 (which can be similar to subcarriers 504 of FIG. 5), OFDM symbols 1006 (which can be similar to OFDM symbols 506), key 1008 (which can be similar to key 508), and SRS transmission optimization component 1010 (which can be similar to SRS transmission optimization component 110A and/or SRS transmission optimization component 110B of FIG. 1).

FIG. 11 and FIG. 12 illustrate an example signal flow 1100 for 5G SA attach and UL Data Flow with trigger SRS Symbol modification using a DCI, and that can facilitate SRS transmission optimization, in accordance with an embodiment of this disclosure. In some examples, part(s) of signal flow 1100 can be implemented by part(s) of system architecture 100 of FIG. 1 to facilitate SRS transmission optimization.

Signal flow 1100 begins with FIG. 11, and then continues to FIG. 12. As depicted, in signal flow 1100, communications are sent between user equipment 1102, gNB 1104, and 5G core (5GC) 1106 (which comprises access and mobility management function (AMF) 1108 and user plane function (UPF) 1110).

The signal flow of signal flow 1100 is an example signal flow, and there can be signal flows that implement different signals, or the signals of signal flow 1100 in a different order, as part of facilitating SRS transmission optimization.

As depicted in signal flow 1100, the following occurs:
5G-NR RRC connection setup 1112
Msg1: Preamble 1114
Allocate temporary Cell Radio Network Temporary Identifier (C-RNTI) 1116
PDCCH DCI Format 1_0 [Random Access RNTI (RA_RNTI)] 1118
Msg2: Random Access Response 1120
Msg3: RRCSetupRequest 1122
PDCCH DCI Format 1_0 [C_RNTI] 1124
Msg4: RRCSetup 1126
PDCCH DCI Format 0_0 [C_RNTI] 1128
RRCSetupComplete 1130
AMF Selection 1132
Initial UE message [Non-Access-Stratum-Protocol Data Unit (NAS-PDU): Registration Request] 1134
NAS Identity Request/Response 1136
NAS Authentication Request/Response 1138
NAS Security Mode Command/Complete 1140
UE capability enquiry 1142A
UE capability information 1142B with dynamicSrsSymbolSwitchSupport [Supported] IE in FeatureSetUplink for uplink
Initial Context Setup Request [NAS-PDU: Registration Accept] 1144
RRCReconfiguration 1146 srs-Config with resourceType=Periodic in BWP-UplinkDedicated IE if UE supports this feature in uplink (which can indicate that the UE already supports a SRS optimization feature that is communicated by the UE in 1142B as part of UE capability information; here, a gNB can add this IE in a RRC Reconfiguration message). In some examples, resourceType can be configured based on what type of SRS mode is enabled, so this parameter can cover periodic, semi-persistent, and aperiodic modes.

RRCReconfigurationComplete 1148
Initial Context Setup Response 1150
SA UE attach procedure completed 1152
Start uplink data transfer & SRS reporting 1154
Uplink data 1156A
Uplink data 1156B
PDCCH DCI Format 0_1 [C_RNTI] 1158
Uplink data [MAC PDU contains PUSCH] 1160
CRC status=PASS for UL PUSCH data 1162
Uplink data 1164A
Uplink data 1164B
SRS report [SNR>=10] 1166
UL data decoding failed at gNB 1168
SRS report [SNR=5, 4, . . . ] 1170
Channel condition getting worse . . . 1172
SRS report [SNR=4, 2, 1, 0, −1, . . . ] 1174
PDCCH DCI format 0_1 [C_RNTI] 1176
Uplink data [MAC PDU contains PUSCH] 1178
CRC status=FAIL for UL PUSCH data because of low SNR 1180
Trigger/change SRS configuration using UL/DL DCI because condition met 1182, where, in some examples, a condition can be UL SINR reporting is bad/good for certain threshold and period; UL CRC=FAIL because SINR is low (e.g., BLER is high for certain threshold and period); UE is on cell edge; UE is on high mobility (so, fast changing radio condition). In some examples this DCI can be used to change a number of SRS symbols.
Uplink data 1184
UE decodes SRS request field and applies the configuration received in UL/DL DCI
PDCCH DCI Format 0_1/1_1 [with SRS Request field in case of Periodic ResourceType] 1188
Uplink data [MAC PDU contains PUSCH] 1190
CRC Status=Pass for ULPUSCH data 1192
UL data 1194
Improvement seen in CRC pass for UL data 1196
UL data transfer continues 1198

FIG. 13 and FIG. 14 illustrate an example signal flow 1300 for 5G SA attach and UL Data Flow with trigger SRS symbol modification using a MAC CE, and that can facilitate SRS transmission optimization in accordance with an embodiment of this disclosure. In some examples, part(s) of signal flow 1300 can be implemented by part(s) of system architecture 100 of FIG. 1 to facilitate SRS transmission optimization.

In general, a difference between signal flow 1300 and signal flow 1100 of FIGS. 11-12 can be that, in signal flow 1300 there is UE decodes MAC CE received for UL direction 1386 (and associated signals), and in signal flow 1100 there is UE decodes SRS request field and applies the configuration received in UL/DL DCI 1186 (and associated signals).

Signal flow 1300 begins with FIG. 13, and then continues to FIG. 14. As depicted, in signal flow 1300, communications are sent between user equipment 1302, gNB 1304, and 5G core (5GC) 1306 (which comprises access and mobility management function (AMF) 1308 and user plane function (UPF) 1310).

The signal flow of signal flow 1300 is an example signal flow, and there can be signal flows that implement different signals, or the signals of signal flow 1300 in a different order, as part of facilitating SRS transmission optimization.

As depicted in signal flow 1300, the following occurs:

5G-NR RRC connection setup 1312

Msg1: Preamble 1314

Allocate temporary C-RNTI 1316

PDCCH DCI Format 1_0 [Random Access RNTI (RA_RNTI)] 1318

Msg2: Random Access Response 1320

Msg3: RRCSetupRequest 1322

PDCCH DCI Format 1_0 [C_RNTI] 1324

Msg4: RRCSetup 1326

PDCCH DCI Format 0_0 [C_RNTI] 1328

RRCSetupComplete 1330

AMF Selection 1332

Initial UE message [NAS-PDU: Registration Request] 1334

NAS Identity Request/Response 1336

NAS Authentication Request/Response 1338

NAS Security Mode Command/Complete 1340

UE capability enquiry 1342A

UE capability information 1342B with dynamicSrsSymbolSwitchSupport [Supported] IE in FeatureSetUplink for uplink Initial Context Setup Request [NAS-PDU: Registration Accept] 1344.

RRCReconfiguration 1346 srs-Config with resourceType=Periodic in BWP-UplinkDedicated IE if UE supports this feature in uplink (which can indicate that the UE already supports a SRS optimization feature that is communicated by the UE in 1342B as part of UE capability information; here, a gNB can add this IE in a RRC Reconfiguration message)

RRCReconfigurationComplete 1348

Initial Context Setup Response 1350

SA UE attach procedure completed 1352

Start uplink data transfer & SRS reporting 1354

Uplink data 1356A

Uplink data 1356B

PDCCH DCI Format 0_1 [C_RNTI] 1358

Uplink data [MAC PDU contains PUSCH] 1360

CRC status=PASS for UL PUSCH data 1362

Uplink data 1364A

Uplink data 1364B

SRS report [SNR>=10] 1366

UL data decoding failed at gNB 1368

SRS report [SNR=5, 4, . . . ] 1370

Channel condition getting worse . . . 1372

SRS report [SNR=4, 2, 1, 0, −1, . . . ] 1374

PDCCH DCI format 0_1 [C_RNTI] 1376

Uplink data [MAC PDU contains PUSCH] 1378

CRC status=FAIL for UL PUSCH data because of low SNR 1380

Trigger/change SRS symbol configuration using MAC CE because condition met 1382, where, in some examples, a condition can be UL SINR reporting is bad/good for certain threshold and period; UL CRC=FAIL because SINR is low (e.g., BLER is high for certain threshold and period); UE is on cell edge; UE is on high mobility (so, fast changing radio condition).

Uplink data 1384

UE decodes MAC CE received for UL direction 1386

Trigger activation/deactivation of SRS symbol information 1388 (using a MAC CE according to the present techniques)

HARQ feedback=ACK for MAC CE 1390

Determine transport block (TB) for PUSCH by using SRS information 1392

PDCCH DCI Format 0_1 [C-RNTI] 1394

Uplink data [MAC PDU contains PUSCH] 1395

CRC Status=Pass for UL PUSCH data 1396

UL data 1397

Improvement seen in CRC pass for UL data 1398

UL data transfer continues 1399

Example Process Flows

FIG. 15 illustrates an example process flow 1500 that can facilitate SRS transmission optimization, in accordance with an embodiment of this disclosure. In some examples, one or more embodiments of process flow 1500 can be implemented by SRS transmission optimization component 110A of gNB 102 FIG. 1, or computing environment 1800 of FIG. 18.

It can be appreciated that the operating procedures of process flow 1500 are example operating procedures, and that there can be embodiments that implement more or fewer operating procedures than are depicted, or that implement the depicted operating procedures in a different order than as depicted. In some examples, process flow 1500 can be implemented in conjunction with one or more embodiments of one or more of process flow 1600 of FIG. 16, and/or process flow 1700 of FIG. 17.

Process flow 1500 begins with 1502, and moves to operation 1504.

Operation 1504 depicts communicating broadband cellular communications with a user equipment. That is, a gNB (e.g., gNB 102 of FIG. 1) can communicate with a UE (e.g., UE 108) using Pcell 104.

After operation 1504, process flow 1500 moves to operation 1506.

Operation 1506 depicts sending a radio resource control message to the user equipment to establish a sounding reference signal mode for the broadband cellular communications, where the sounding reference signal mode is a periodic mode. In some examples, this RRC message can be similar to RRCReconfiguration 1146 (srs-Config with resource Type=Periodic in BWP-UplinkDedicated IE if UE supports this feature in uplink) of FIG. 11, and/or RRCReconfiguration 1346 of FIG. 13.

After operation 1506, process flow 1500 moves to operation 1508.

Operation 1508 depicts sending a second message in a second format to the user equipment, where the second format differs from a radio resource control format, and where the second message indicates changing a number of sounding reference signal positions. In some examples, this second message can be a DCI message like in 1188A of FIG. 11 (e.g., in some examples, the second message comprises a downlink control information message), or a MAC CE message like in 1388A of FIG. 13 (e.g., the second message comprises a medium access control control element message).

In some examples, changing a number of sounding reference signal positions comprises modifying the number of SRS symbols that the UE will use (e.g., increasing the number, decreasing the number, or not using SRS symbols). This modifying a number of SRS symbols can be viewed in contrast to modifying positions of SRS symbols.

For example, where four symbols were used this is reduced to two symbols, it can be that the UE will transmit only on the first two symbols and not transmit on the next two symbols. Similarly, where two symbols were used this is reduced to one symbol, it can be that the UE will transmit only on the first symbol and not transmit on the next three symbols.

In some examples, the second message indicates increasing the number of sounding reference signal positions. In some examples, the second message indicates decreasing the number of sounding reference signal positions. That is, changing the number of sounding reference signal positions can comprise increasing or decreasing the number.

In some examples, a first data size of the second message is smaller than a second data size of the radio resource control message. That is, a DCI or MAC CE message can be used to configure SRS messaging because a DCI/MAC CE message has a smaller data size than a corresponding RRC message, so bandwidth can be conserved.

In some examples, a gNB that implements process flow 1500 comprises a centralized unit and a distributed unit, the radio resource control message is sent to the user equipment from the centralized unit, the second message is sent to the user equipment from the distributed unit, and a first amount of time associated with sending the user equipment the radio resource control message from the centralized unit is greater than a second amount of time associated with sending the user equipment the second message from the distributed unit. That is, a DCI or MAC CE message for configuring SRS can be transmitted faster than a RRC message for configuring SRS because the DCI or MAC CE message is transmitted from a DU while a RRC is transmitted from a CU.

After operation 1508, process flow 1500 moves to operation 1510.

Operation 1510 depicts receiving, from the user equipment, a third message that utilizes the number of sounding reference signal positions to convey sounding reference signal information. In some examples, this third message can be similar to 1190 of FIG. 11 or 1390 of FIG. 13.

After operation 1510, process flow 1500 moves to operation 1512.

Operation 1512 depicts saving an indication of a channel quality that corresponds to the broadband cellular communications based on the sounding reference signal information in the third message. That is, a gNB can save channel quality information in a computer memory.

After operation 1512, process flow 1500 moves to 1514, where process flow 1500 ends.

FIG. 16 illustrates an example process flow 1600 that can facilitate SRS transmission optimization, in accordance with an embodiment of this disclosure. In some examples, one or more embodiments of process flow 1600 can be implemented by SRS transmission optimization component 110A of gNB 102 of FIG. 1, or computing environment 1800 of FIG. 18.

It can be appreciated that the operating procedures of process flow 1600 are example operating procedures, and that there can be embodiments that implement more or fewer operating procedures than are depicted, or that implement the depicted operating procedures in a different order than as depicted. In some examples, process flow 1600 can be implemented in conjunction with one or more embodiments of one or more of process flow 1500 of FIG. 15, and/or process flow 1700 of FIG. 17.

Process flow 1600 begins with 1602, and moves to operation 1604.

Operation 1604 depicts, as part of broadband cellular communications with user equipment, sending a radio resource control message to the user equipment to establish a periodic sounding reference signal mode for the broadband cellular communications. In some examples, operation 1604 can be implemented in a similar manner as operations 1504-1506 of FIG. 15.

In some examples, operation 1604 comprises receiving, from the user equipment, a downlink control information message that comprises an information element that indicates that the user equipment supports the modifying of the number of sounding reference signal positions. That is, using the above example, a UE capability message can indicate that the UE supports SRS transmission optimization (e.g. dynamicSRSSymbolSwitchSupport).

After operation 1604, process flow 1600 moves to operation 1606.

Operation 1606 depicts sending a second message in a second format to the user equipment, where the second format differs from a radio resource control format, and where the second message indicates modifying a number of sounding reference signal positions. In some examples, operation 1606 can be implemented in a similar manner as operation 1508 of FIG. 15.

In some examples, the second message comprises a downlink control information message, and the second message comprises a sounding reference signal request field that specifies a sounding reference signal resource set to use in the sounding reference signal transmission. In some examples, the indication is a first indication, and the sounding reference signal resource set comprises a second indication of a number of symbols in a time domain. That is, DCI_0_1 and DCI_1_1 messages can be used to request the UE to transmit SRS. The SRS request filed within the DCI can be used specify the SRS resource set to use. The SRS resource set (ranging from 0 to 15) can specify SRS resources the UE should transmit on. The SRS resources can specify a number of symbols (1, 2, or 4) in time domain, in addition to other parameters like a transmission comb, a number of SRS ports, etc.

In some examples, the second message comprises a medium access control control element message that comprises a first portion that identifies a logical channel identifier and a second portion that identifies the number of sounding reference signal positions. That is, using the above example, a MAC CE message can comprise an LCID and a SRS symbol length field.

In some examples, the second message comprises a downlink control information message that indicates scheduling a physical uplink shared channel in one cell. That is, a DCI 0_1 message can be used to request that a UE transmit a SRS message. In some examples, the second message comprises a downlink control information message that indicates scheduling a physical downlink shared channel in one cell. That is, a DCI 1_1 message can be used to request that a UE transmit a SRS message.

In some examples, sending the radio resource message is performed by a centralized unit of a system that implements process flow 1600, sending the second message is performed by a distributed unit of the system, and a first amount of time associated with sending the radio resource control message from the centralized unit is greater than a second amount of time associated with sending the second message from the distributed unit.

After operation 1606, process flow 1600 moves to operation 1608.

Operation 1608 depicts receiving, from the user equipment, a third message that utilizes the number of sounding reference signal positions to convey sounding reference signal information. In some examples, operation 1608 can be implemented in a similar manner as operation 1510 of FIG. 15.

After operation 1608, process flow 1600 moves to operation 1610.

Operation 1610 depicts saving an indication of a channel quality that corresponds to the broadband cellular communications based on the sounding reference signal information in the third message. In some examples, operation 1610 can be implemented in a similar manner as operation 1512 of FIG. 15.

After operation 1610, process flow 1600 moves to 1612, where process flow 1600 ends.

FIG. 17 illustrates an example process flow 1700 that can facilitate SRS transmission optimization, in accordance with an embodiment of this disclosure. In some examples, one or more embodiments of process flow 1700 can be implemented by SRS transmission optimization component 110A of gNB 102 of FIG. 1, or computing environment 1800 of FIG. 18.

It can be appreciated that the operating procedures of process flow 1700 are example operating procedures, and that there can be embodiments that implement more or fewer operating procedures than are depicted, or that implement the depicted operating procedures in a different order than as depicted. In some examples, process flow 1700 can be implemented in conjunction with one or more embodiments of one or more of process flow 1500 of FIG. 15, and/or process flow 1700 of FIG. 17.

Process flow 1700 begins with 1702, and moves to operation 1704.

Operation 1704 depicts sending, to a user equipment, a first message in a first format to establish a sounding reference signal mode for broadband cellular communications with the user equipment. In some examples, operation 1704 can be implemented in a similar manner as operations 1504-1506 of FIG. 15.

In some examples, the first message is sent via a network layer of the broadband cellular communications, and the network layer differs from a physical layer, and a medium access control layer. That is, the first message can comprise a RRC/L3 message.

After operation 1704, process flow 1700 moves to operation 1706.

Operation 1706 depicts sending, to the user equipment, a second message in a second format, where the first format differs from the second format, and where the second message indicates modifying a number of sounding reference signal positions. In some examples, operation 1706 can be implemented in a similar manner as operation 1508 of FIG. 15.

In some examples, the second message (and in some examples, the third message) is sent via a network layer of the broadband cellular communications, and the network layer differs from a physical layer, and a medium access control layer. That is, the second message can comprise a MAC CE/L2 message.

In some examples, the second message (and in some examples, the third message) is sent via a physical layer of the broadband cellular communications, and the physical layer differs from a network layer, and a medium access control layer. That is, the second message can comprise a DCI/L1 message.

In some examples, a system that implements process flow 1700 comprises a centralized unit and a distributed unit, the first message is originated in the centralized unit, and the second message (and in some examples, the third message) is originated in the distributed unit. That is, a DCI or MAC CE message for configuring SRS can be transmitted faster than a RRC message for configuring SRS because the DCI or MAC CE message is transmitted from a DU while a RRC is transmitted from a CU.

After operation 1706, process flow 1700 moves to operation 1708.

Operation 1708 depicts receiving, from the user equipment, a third message that utilizes the number of sounding reference signal positions to convey sounding reference signal information. In some examples, operation 1708 can be implemented in a similar manner as operation 1510 of FIG. 15.

After operation 1708, process flow 1700 moves to operation 1710.

Operation 1710 depicts saving an indication of a channel quality that corresponds to the broadband cellular communications based on the sounding reference signal information in the third message. In some examples, operation 1710 can be implemented in a similar manner as operation 1512 of FIG. 15.

After operation 1710, process flow 1700 moves to 1712, where process flow 1700 ends.

Example Operating Environment

Figure 18:
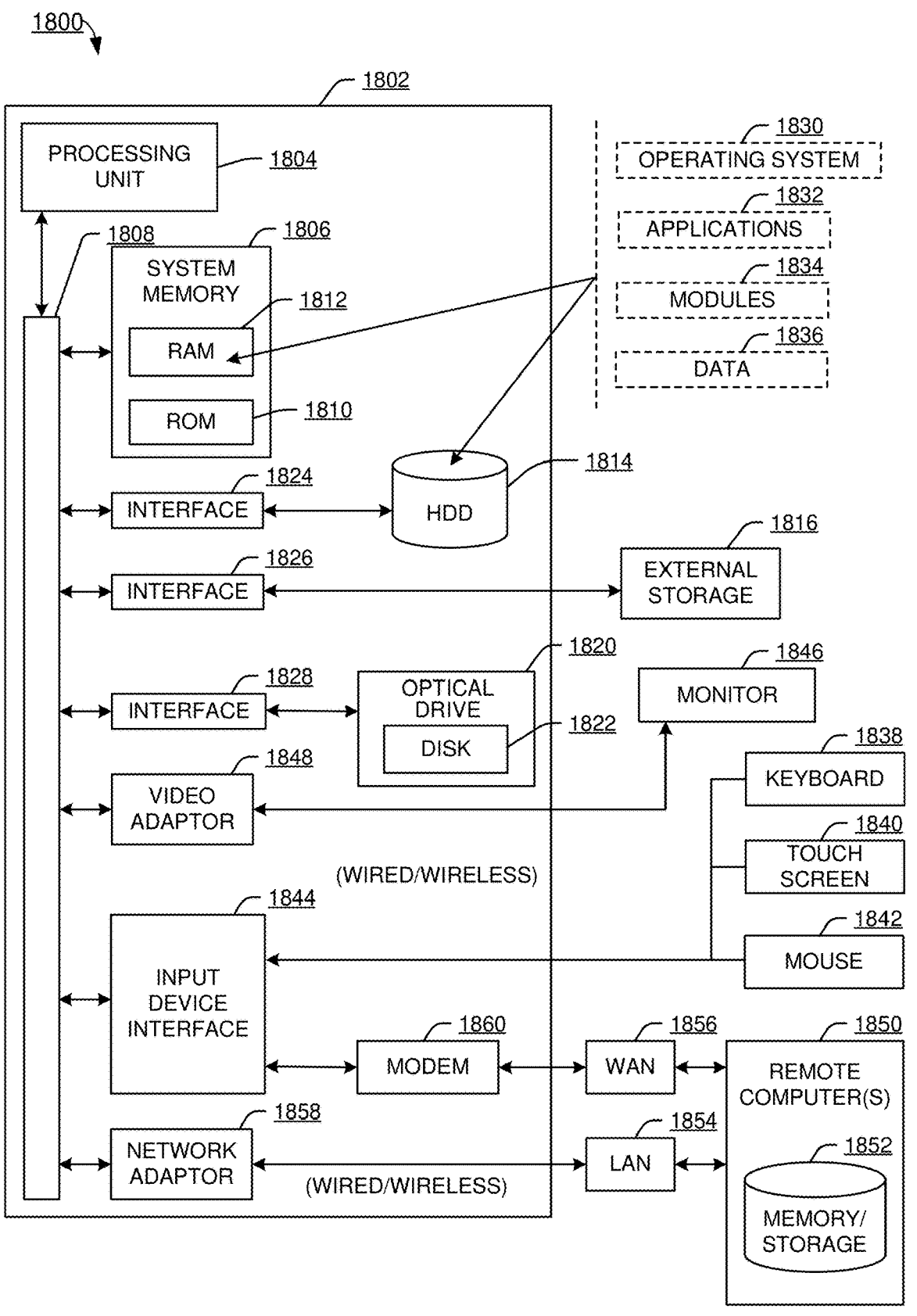
FIG. 18 illustrates an example block diagram of a computer operable to execute an embodiment of this disclosure.

In order to provide additional context for various embodiments described herein, FIG. 18 and the following discussion are intended to provide a brief, general description of a suitable computing environment 1800 in which the various embodiments of the embodiment described herein can be implemented.

For example, parts of computing environment 1800 can be used to implement one or more embodiments of gNB 102, Pcell 104, and/or UE 108, of FIG. 1.

In some examples, computing environment 1800 can implement one or more embodiments of the process flows of FIGS. 11-13 to facilitate SRS transmission optimization.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a nonvolatile storage such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and an optical disk drive 1820 (e.g., which can read or write from a CD-ROM disc, a DVD, a BD, etc.). While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and optical disk drive 1820 can be connected to the system bus 1808 by an HDD interface 1824, an external storage interface 1826 and an optical drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired and/or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 and/or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1854 through a wired and/or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other means for establishing communications over the WAN 1856, such as by way of the Internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/storage device 1852. It will be appreciated that the network connections shown are examples and other means of establishing a communications link between the computers can be used.

When used in either a LAN or WAN networking environment, the computer 1802 can access cloud storage systems or other network-based storage systems in addition to, or in place of, external storage devices 1816 as described above. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 and/or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster." "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory coupled to the processor, comprising instructions that, in response to execution by the at least one processor, cause the system to perform operations, comprising:
      communicating broadband cellular communications with a user equipment;
      sending a radio resource control message to the user equipment to establish a sounding reference signal mode for the broadband cellular communications, wherein the sounding reference signal mode is a periodic mode, and wherein the radio resource control message is sent to the user equipment from a centralized unit of the system;
      sending a second message in a second format to the user equipment, wherein the second format differs from a radio resource control format, wherein the second message indicates changing a number of sounding reference signal positions, wherein the second message is sent to the user equipment from a distributed unit of the system, and wherein a first amount of time associated with sending the radio resource control message to the user equipment from the centralized unit is greater than a second amount of time associated with sending the second message to the user equipment from the distributed unit;
      receiving, from the user equipment, a third message that utilizes the number of sounding reference signal positions to convey sounding reference signal information; and saving an indication of a channel quality that corresponds to the broadband cellular communications based on the sounding reference signal information in the third message.

2. The system of claim 1, wherein the second message comprises a downlink control information message.

3. The system of claim 1, wherein the second message comprises a medium access control control element message.

4. The system of claim 1, wherein the second message indicates increasing the number of sounding reference signal positions.

5. The system of claim 1, wherein the second message indicates decreasing the number of sounding reference signal positions.

6. The system of claim 1, wherein a first data size of the second message is smaller than a second data size of the radio resource control message.

7. A method, comprising:

as part of broadband cellular communications with user equipment, sending, by a system comprising at least one processor, a radio resource control message to the user equipment to establish a periodic sounding reference signal mode for the broadband cellular communications, wherein sending the radio resource message is performed by a centralized unit of the system;

sending, by the system, a second message in a second format to the user equipment, wherein the second format differs from a radio resource control format, wherein the second message indicates modifying a number of sounding reference signal positions, wherein sending the second message is performed by a distributed unit of the system, and wherein a first amount of time associated with sending the radio resource control message from the centralized unit is greater than a second amount of time associated with sending the second message from the distributed unit;

receiving, by the system and from the user equipment, a third message that utilizes the number of sounding reference signal positions to convey sounding reference signal information; and saving, by the system, an indication of a channel quality that corresponds to the broadband cellular communications based on the sounding reference signal information in the third message.

8. The method of claim 7, wherein the second message comprises a downlink control information message, and wherein the second message comprises a sounding reference signal request field that specifies a sounding reference signal resource set to use in the sounding reference signal transmission.

9. The method of claim 8, wherein the indication is a first indication, and wherein the sounding reference signal resource set comprises a second indication of a number of symbols in a time domain.

10. The method of claim 7, wherein the second message comprises a medium access control control element message that comprises a first portion that identifies a logical channel identifier and a second portion that identifies the number of sounding reference signal positions.

11. The method of claim 7, wherein the second message comprises a downlink control information message that indicates scheduling a physical uplink shared channel in one cell.

12. The method of claim 7, wherein the second message comprises a downlink control information message that indicates scheduling a physical downlink shared channel in one cell.

13. The method of claim 7, further comprising:

receiving, by the system and from the user equipment, a downlink control information message that comprises an information element that indicates that the user equipment supports the modifying of the number of sounding reference signal positions.

14. A non-transitory computer-readable medium comprising instructions that, in response to execution, cause a system comprising at least one processor to perform operations, comprising:

sending, by a centralized unit of the system and to a user equipment, a first message in a first format to establish a sounding reference signal mode for broadband cellular communications with the user equipment;

sending, by a distributed unit of the system and to the user equipment, a second message in a second format, wherein the first format differs from the second format, wherein the second message indicates modifying a number of sounding reference signal positions, and wherein a first amount of time associated with sending the first message from the centralized unit is greater than a second amount of time associated with sending the second message from the distributed unit;

receiving, from the user equipment, a third message that utilizes the number of sounding reference signal positions to convey sounding reference signal information; and saving an indication of a channel quality that corresponds to the broadband cellular communications based on the sounding reference signal information in the third message.

15. The non-transitory computer-readable medium of claim 14, wherein the first message is sent via a network layer of the broadband cellular communications, and wherein the network layer differs from a physical layer, and a medium access control layer.

16. The non-transitory computer-readable medium of claim 14, wherein the second message is sent via a physical layer of the broadband cellular communications, and wherein the physical layer differs from a network layer, and a medium access control layer.

17. The non-transitory computer-readable medium of claim 14, wherein the second message is sent via a medium access control layer of the broadband cellular communications, and wherein the medium access control layer differs from a network layer, and a physical layer.

18. The non-transitory computer-readable medium of claim 14, wherein the system comprises a centralized unit and a distributed unit, wherein the first message is originated in the centralized unit, and wherein the second message is originated in the distributed unit.

19. The non-transitory computer-readable medium of claim 14, wherein the second message comprises a downlink control information message, and wherein the second message comprises a sounding reference signal request field that specifies a sounding reference signal resource set to use in the sounding reference signal transmission.

20. The non-transitory computer-readable medium of claim 14, wherein the operations further comprise:

receiving, from the user equipment, a downlink control information message that comprises an information element that indicates that the user equipment supports the modifying of the number of sounding reference signal positions.

* * * * *